United States Patent [19]

Stuchlik, III et al.

[11] Patent Number: 5,522,229
[45] Date of Patent: Jun. 4, 1996

[54] BLOCKAGE DETECTOR

[76] Inventors: Charles F. Stuchlik, III, Rte. 1, Box 304-B, Milton, Del. 19968; Gerald S. Spanger, 402 Merrywood Dr., Edison, N.J. 08817

[21] Appl. No.: 335,369

[22] Filed: Nov. 3, 1994

[51] Int. Cl.[6] ................................................. F25B 49/02
[52] U.S. Cl. ............................ 62/127; 62/129; 62/284; 340/620
[58] Field of Search ............................ 62/126, 127, 128, 62/129, 188, 284; 340/616, 620

[56] References Cited

U.S. PATENT DOCUMENTS

| | | |
|---|---|---|
| 1,156,907 | 10/1915 | King . |
| 2,686,662 | 4/1951 | Smith . |
| 2,962,337 | 11/1960 | Morrissey, Jr. et al. . |
| 3,050,957 | 8/1962 | Robbie . |
| 3,719,209 | 3/1973 | Rush et al. . |
| 3,853,339 | 12/1974 | Wilson . |
| 3,908,208 | 9/1975 | McIlroy . |
| 4,126,857 | 11/1978 | Lancia et al. ............................ 340/620 |
| 4,179,762 | 12/1979 | Barnhardt et al. . |
| 4,382,382 | 5/1983 | Wang ................................. 340/620 X |
| 4,392,128 | 7/1983 | Young et al. ....................... 340/620 X |
| 4,553,400 | 11/1985 | Branz ................................... 62/129 X |
| 4,555,057 | 11/1985 | Foster ................................... 62/127 X |
| 4,633,673 | 1/1987 | Morrison et al. ........................ 62/129 |
| 4,671,076 | 6/1987 | Duren . |
| 4,937,559 | 6/1990 | Meacham et al. .................... 62/129 X |
| 4,961,068 | 10/1990 | Hendricksen ......................... 340/616 |
| 5,069,042 | 12/1991 | Stuchlik, III .............................. 62/284 |
| 5,196,729 | 3/1993 | Thorngren ......................... 340/620 X |

OTHER PUBLICATIONS

The Alert 2000 Water Alarm (pre Nov. 1994).
The Condensate Overflow Alarm by Par Bar Enterprises Co. (pre Nov. 1994).
"New Device Controls HVAC Condensate," Tech. Update, Sep., 1992 (bi-monthly publication of the Air Conditioning and Refrigeration Institute).
CostGard™ Condensate Control Device Brochure from Trent Technlogies, Inc., Jul. 1993.
Universal Moisture Mat brochure (pre Nov. 1994).
COP5 Condensate Overflow Protector brochure by Beckett Corporation (pre Nov. 1994).

*Primary Examiner*—Harry B. Tanner
*Attorney, Agent, or Firm*—Oliff & Berridge

[57] ABSTRACT

A drain tube that can be used, for example, in an air cooling system, includes an inlet end for attachment to the drain pan of the air handler, and an outlet end for transporting liquid out of the drain pan. A liquid sensor probe is located at least partially in the drain tube, and includes a probe end that extends from the drain tube inlet end into the drain pan when attached to the drain pan. The liquid sensor probe detects the undesired accumulation of liquid in the drain pan caused by a blockage in the drain pan, in the drain tube, or in any other portion of the drainage tubing. A control circuit generates an output signal when excess liquid is present at the probe end of the liquid sensor so as to sound an alarm and/or turn off the air cooling device. The outlet end of the drain tube can be attached to a first leg of a cross-shaped fitting. The cross-shaped fitting includes a second leg opposite to the first leg through which a cleaning device can access the first leg, the drain tube, and the drain pan. A U-shaped trap also can be attached to the cross-shaped fitting and can be cleaned by insertion of the cleaning device through the cross-shaped fitting and the U-shaped tube.

41 Claims, 5 Drawing Sheets

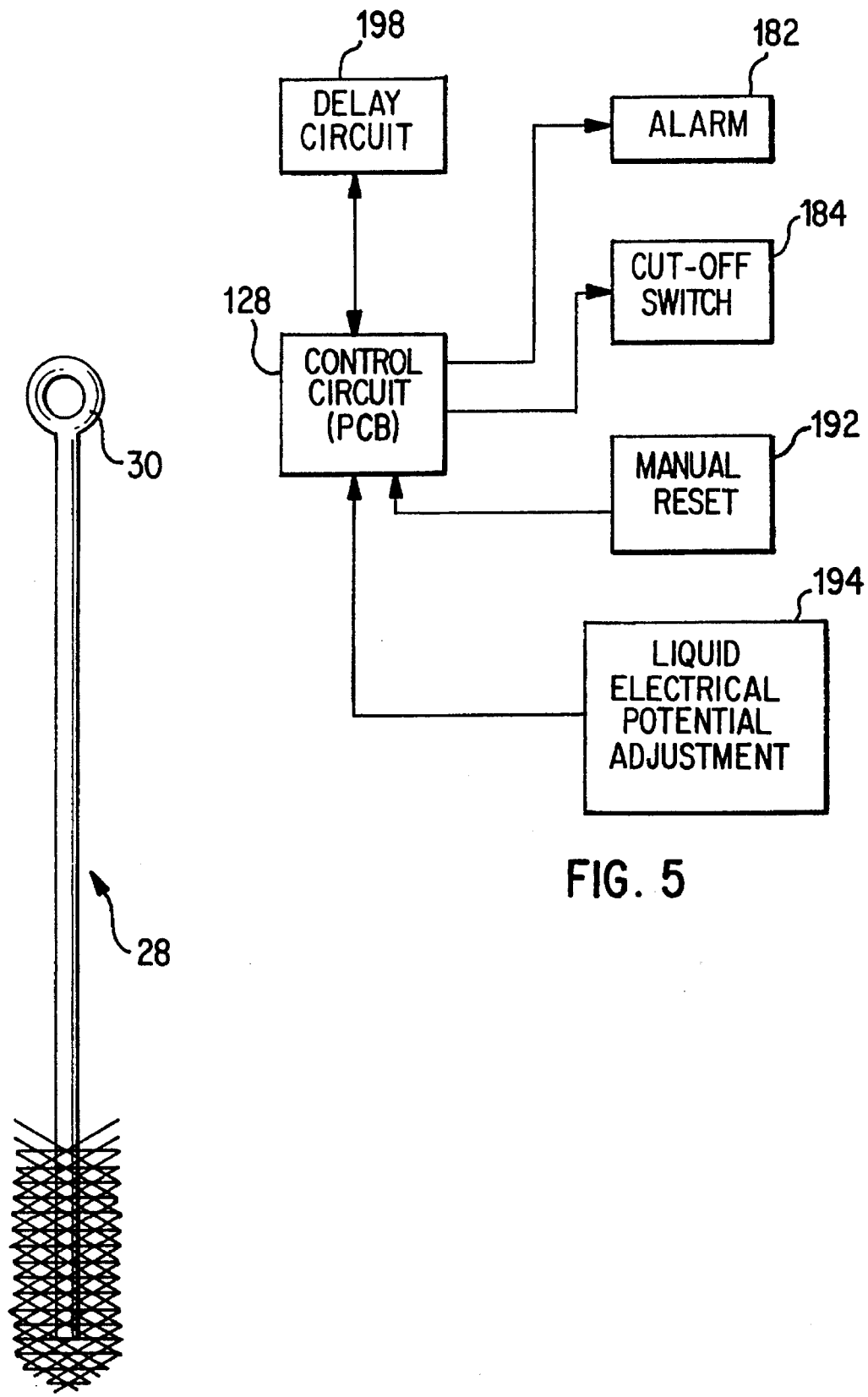

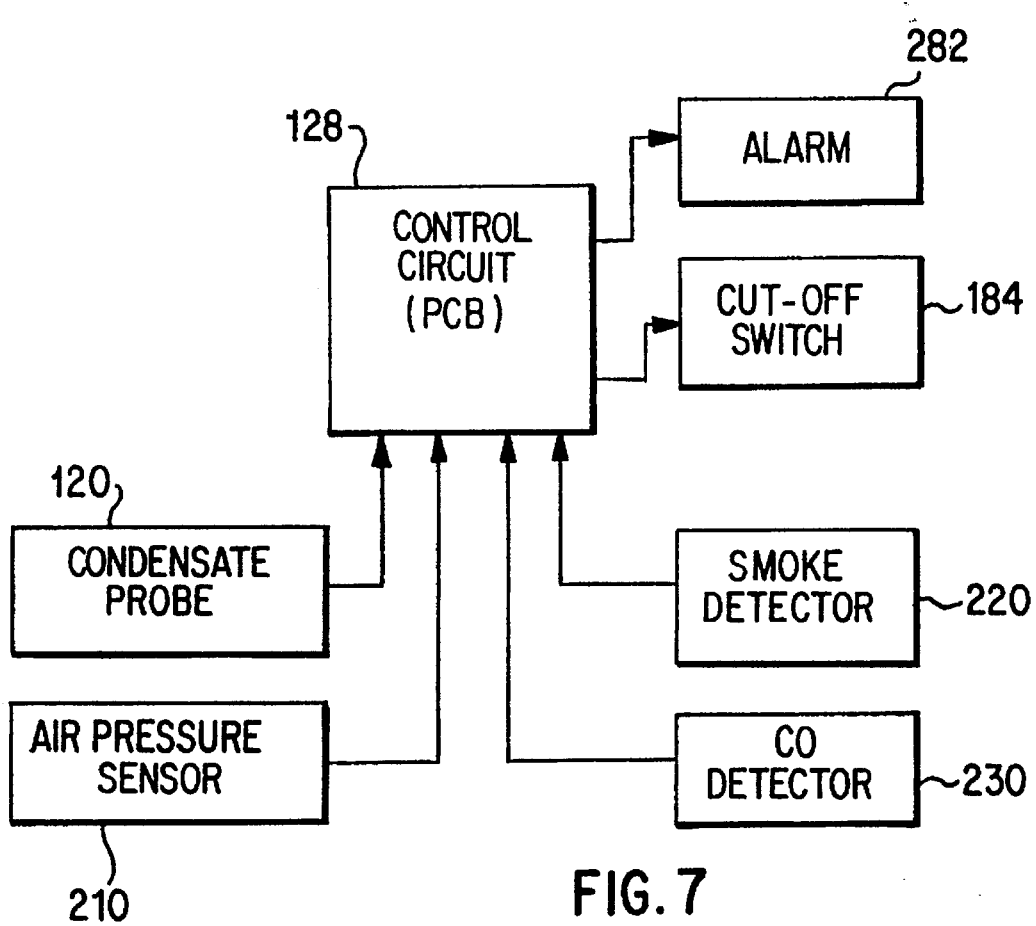

BLOCKAGE DETECTOR

BACKGROUND OF THE INVENTION

1. Field of the Invention

The present invention relates to blockage detectors, and in particular to blockage detectors that can be incorporated into air cooling systems to detect blockage in portions of the condensate drainage tubing.

2. Description of Related Art

U.S. Pat. No. 5,069,042 discloses a cleanable condensate trap that can be used in the condensate drainage tubing of an air cooling system. The cleanable condensate trap is designed so that any blockage existing in the trap can be easily detected and removed, for example, using a flexible brush that can be inserted through a U-shaped tube that forms part of the trap. A mechanical switching mechanism including a float can be included in a portion of the trap. The switching mechanism is arranged so that when liquid collects in the trap due to a blockage in the trap or in the tubing located downstream of the trap, the float rises so as to cause a mechanical switch to shut off the air cooling system and/or trigger an alarm. This prevents further liquid from collecting in the air handling system, which ultimately would overflow causing damage to dry wall, ceilings, walls, etc. in the building.

FIGS. 1 and 2 illustrate aspects of the cleanable condensate trap disclosed in U.S. Pat. No. 5,069,042. FIG. 1 is a diagrammatic view of an air cooling system incorporating the cleanable condensate trap of U.S. Pat. No. 5,069,042. The cooling system includes an air cooling device 2, for example, a central air conditioning unit or a heat pump. The air cooling device is operatively associated with an air handler 6, which includes heat exchange coils 4, that carry a cold material for cooling warm air conveyed to the air handler 6 through inlet duct 8. Cooled air is conveyed away from air handler 6 through outlet duct 10. As the air is cooled, liquid in the air condenses and is removed from the air and conveyed away from air handler 6 through tubes 12, 14 to, for example, a drain. The cleanable condensate trap 20 is located between the tubes 12 and 14, and provides a liquid seal between air located in air handler 6 and air located downstream of tube 14. The air cooling device 2 is controlled by, for example, a thermostat 16, which is electrically connected to the air cooling device 2 via a circuit 18. A switch 50 is operatively associated with the trap 20. Switch 50 opens circuit 18 when liquid in trap 20 rises to a predetermined level due to clogging of trap 20.

FIG. 2 is an exploded view of the switch of FIG. 1, and the structure for mounting the switch to a leg of a T-shaped tube, which forms part of the cleanable condensate trap 20. A microswitch holder/cover 83 removably mounts a microswitch 80 in a leg 24c of a T-shaped tube 24. Microswitch holder/cover 83 includes a holding portion 84, which removably attaches to microswitch 80 by, for example, the insertion of tabs 85 into holes 82 formed in the microswitch 80. Microswitch holder/cover 83 also includes cover portion 86, which extends outwardly from holder portion 84 a distance sufficient to entirely close the opening provided in leg 24c. An annular mounting portion 88 extends downwardly from cover portion 86 and is inserted into the opening in the leg 24c. For further details on the float structure, see U.S. Pat. No. 5,069,042, the disclosure of which is incorporated herein by reference in its entirety.

The above-described structure, however, cannot detect when the drain pan of the air handler or when the tubing located between the drain pan and the trap becomes clogged because liquid is prevented from reaching the U-shaped portion of the trap, and, thus the float is not actuated to open the microswitch. Additionally, it can be difficult to remove a clog from the pan and/or from the tubing between the trap and the drain pan with the cleanable condensate trap of U.S. Pat. No. 5,069,042. Accordingly, in such situations, the drain pan can become filled and overflow without detection by the sensor in the trap.

Occasionally a float malfunctions or ceases working properly because its mounting screws, linkages, etc. become loosened due to vibrations that the trap and associated tubing are subjected to during normal operation of the air cooling system.

Some jurisdictions require a secondary pan to be placed below the primary drain pan of the air handler in order to collect overflow that would occur when the primary drain pan or drain tubing becomes clogged. It is known to place a sensor (either a mechanical float or an electronic sensor) in the secondary drain pan to detect when liquid is overflowing from the primary drain pan to the secondary drain pan. These sensors can be float actuated or electronic.

It is also known to include float switches in the primary drain pan in order to detect when liquid in the drain pan reaches an undesired level due to a blockage.

However, it is necessary to open the air cooling unit in order to place the float or electronically activated switches in the primary or secondary drain pans, which can be difficult after installation. Additionally, these systems do not switch off the air cooling system when a clog is detected, but merely sound their own integrally-provided alarm, which can be difficult to hear, especially when the air cooling system is provided at a remote location of the building. If no one hears the alarm and/or if corrective actions are not undertaken in a timely fashion, so that the air cooling system continues to operate, water damage due to overflow from the primary or secondary drain pans can occur. Such systems also do not provide for easy access to the drain pan or to the drain tubing in order to remove the blockage.

Accordingly, it is desirable to eliminate the need for a secondary drain pan, and to avoid the possibility of the primary drain pan overflowing should it or any of the drain tubing become clogged.

SUMMARY OF THE INVENTION

In order to achieve the above and other objects, and to overcome the shortcomings set forth above, a drain tube having an inlet end for attachment to an air handler drain pan, and an outlet end for transporting liquid out of the drain pan is provided with a liquid sensor probe. The liquid sensor probe is located at least partially in the drain tube, and includes a probe end that extends from the drain tube inlet end (i.e., into the drain pan when attached to the drain pan). Accordingly, the liquid sensor probe will detect the undesired accumulation of liquid in the drain pan caused by a blockage regardless of the location of the blockage (i.e., whether the blockage is in the drain pan, the drain tube, or any tubing located beyond (i.e., downstream of) the outlet of the drain tube, for example, a condensate trap).

A control circuit such as, for example, a printed circuit board (PCB) can be attached to a second end of the liquid sensor probe. The control circuit generates an output signal when excess liquid is present at the probe end of the liquid sensor probe. The output signal can be used to sound an alarm and/or turn off the air cooling device, for example, by opening a switch. In a preferred embodiment, the control circuit is mounted on the drain tube, and is encapsulated by a resin.

The inlet end of the drain tube can include a connector, such as a threaded coupling, so that the drain tube can be easily attached to existing drain pans. Similarly, the threaded coupling allows for the drain tube and associated liquid sensor probe and control circuit to be easily replaced should it become worn and/or damaged. Additionally, a control unit, which is comprised of the encapsulated control circuit, can be made detachable from the drain tube and liquid sensor probe so that the electronics can be replaced and/or upgraded easily.

Preferably, the outlet end of the drain tube is attached to a first leg of a cross-shaped fitting. The cross-shaped fitting includes a second leg opposite to the first leg, a third leg located between the first and second legs, and a fourth leg located opposite to the third leg. The third leg can be attached to a first leg of a U-shaped trap tube, which can be transparent. Preferably, the second and fourth legs of the cross-shaped fitting are provided with removable covers. A cleaning device, such as, for example a flexible brush, can be passed through the second leg, the first leg and the drain tube so as to easily remove any blockage located in the drain tube or in the drain pan. The cleaning device also can be easily passed through the fourth and third legs of the cross-shaped fitting and into the U-shaped trap tube in order to remove any blockages from the U-shaped trap tube.

The control circuit can be provided with additional features so that its operation can be optimized for a particular environment and/or to meet the code requirements of a particular jurisdiction. For example, a manual reset button can be provided that prevents the air cooling system from re-starting unless the manual reset button is actuated. Additionally, an adjustable sensitivity control circuit can be provided to control the sensitivity with which the output signal is generated by the control circuit. The adjustable sensitivity control circuit can compensate for the electrical potential of liquid located at the probe end of the liquid sensor probe (e.g., the liquid in the drain pan of the air handler). This can compensate for the type of particles present in the air (and consequently present in the condensate) for a particular location.

The control circuit also can include an adjustable delay circuit that controls a delay period required between a time that liquid is initially sensed by the probe end and a time when the output signal is generated. This feature avoids unnecessary shutoff of the air cooling system, which might occur due to liquid movement within the drain pan. The adjustable delay circuit would require that liquid remain sensed by the probe end of the liquid sensor probe for a predetermined time period prior to generation of the output signal.

An additional advantage of the invention is that the control circuit can be designed so that the control circuit monitors and indicates (e.g., by sounding an alarm) conditions in addition to blockage of the condensate drain system. For example, a pressure sensor can be provided in the flow duct(s) of the air cooling system and attached to the control circuit so that a clogged condition of one or more air filters in the flow duct(s) can be monitored. When the sensed air pressure rises above a predetermined value due to clogging of an air filter (or other blockage in the air duct) the control circuit would activate an audible or visible alarm.

A smoke detector and/or a carbon monoxide detector also could be provided in the flow duct (or external of the air cooling system) and attached to the control circuit so that appropriate alarms can be activated as appropriate. In this way, the control circuit can control a central alarm system that indicates the status of numerous conditions in one unit (such as a house) or in a plurality of units (such as with a motel, hotel, etc.).

BRIEF DESCRIPTION OF THE DRAWINGS

The invention will be described in conjunction with the following drawings in which like reference numerals designate like elements and wherein:

FIG. 4 is an isometric view of a cleaning tool usable with the FIG. 3 trap and drain tube;

FIG. 5 is a block diagram of the control system usable with the FIG. 3 condensate trap;

FIG. 7 is a block diagram of a modified control system for monitoring conditions in addition to the condensate drain system; and FIG. 8 is a front view of an alarm display.

DETAILED DESCRIPTION OF PREFERRED EMBODIMENTS

Figure 2:
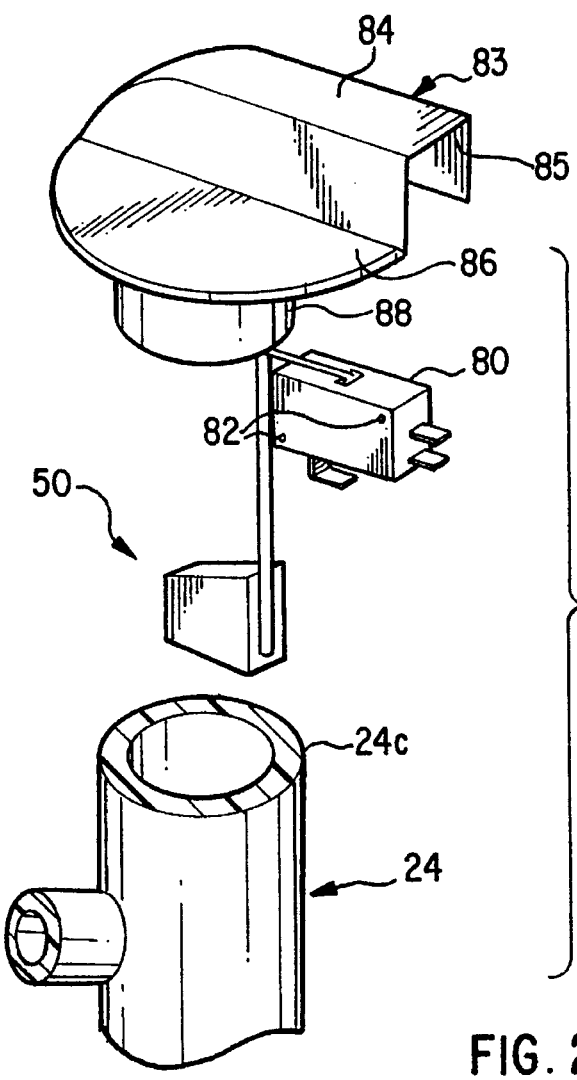
FIG. 2 is an exploded view of a float switch that is provided in the trap of the FIG. 1 prior art system.
Figure 3:
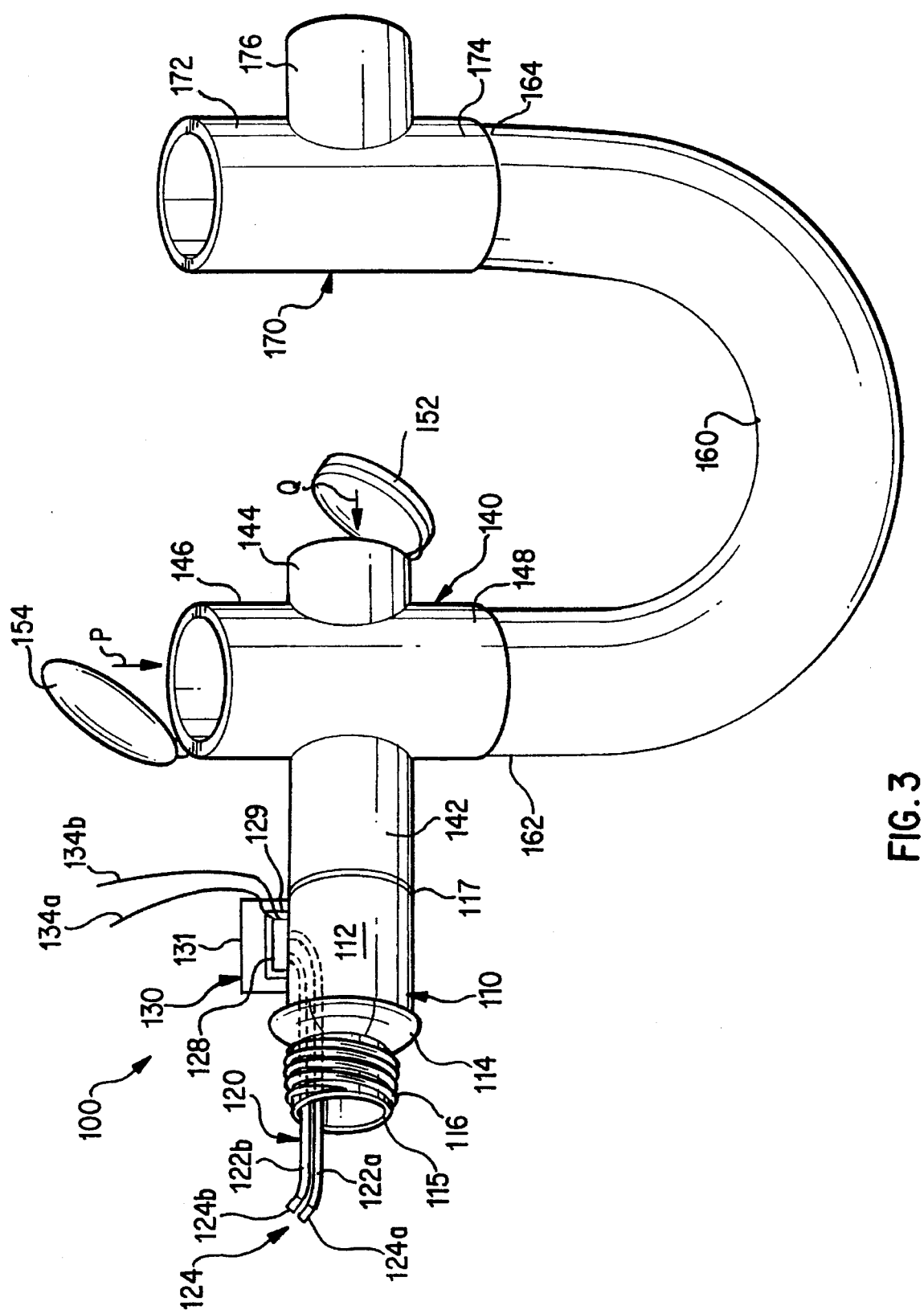
FIG. 3 is an isometric view of a cleanable condensate trap incorporating the electronic liquid sensor probe of an embodiment of the present invention.

FIG. 3 illustrates one preferred embodiment of the invention. In FIG. 3, a drain tube/liquid sensor assembly 100 is attached to a cleanable condensate trap assembly that is somewhat similar to the cleanable condensate trap shown in U.S. Pat. No. 5,069,042, except that a cross-shaped fitting 140 is provided instead of the T-shaped fitting 24 (see FIG. 2). (The advantage of the cross-shaped fitting 140, and in particular to the provision of the leg 144 will be described below.) Additionally, the mechanical float assembly of FIG. 2 is not used in the system of FIG. 3. While FIG. 3 illustrates the drain tube liquid sensor 100 connected to the cleanable condensate trap, the unit 100 could be provided separate from the cleanable condensate trap and/or used with traps having a structure different from the FIG. 3 trap.

The drain tube/liquid sensor unit 100 includes a drain tube 110 having an inlet end 115 and an outlet end 117. The inlet end 115 preferably includes a connector such as a threaded coupling 116, which allows unit 100 to be easily attached and removed from a liquid collecting pan, such as the drain pan of an air handling system. Drain tube 110 also includes a body portion 112 and a gripping portion 114 for engagement with a wrench, for example. The drain tube 110 includes a liquid sensor probe 120 located at least partially in the drain tube 110. The liquid sensor probe 120 includes a probe end 124 that extends from the drain tube inlet end 115.

In a preferred embodiment, liquid sensor probe 120 includes two stainless steel probe elements 122a and 122b. The stainless steel probe elements are sheathed in an insulating material, such as plastic, except for their probe ends 124a and 124b.

A control circuit 128 is coupled to second ends of the probe elements 122a, 122b. As is well known in the art of liquid detection, the control circuit 128 applies a potential between probe ends 124a, 124b so as to sense a resistance between the probe ends 124a, 124b. When liquid is present between the probe ends 124a, 124b, the resistance between the probe ends 124a, 124b drops and therefore is sensed by control circuit 128. When the detected resistance drops, control circuit 128 determines that liquid is present between the probe ends. Probe ends 124a, 124b can be appropriately positioned in the drain pan so that liquid will only exist between the probe ends 124a, 124b when a blockage exists somewhere in the drainage system, or in the drain pan itself.

The control circuit generates an output signal when the liquid is sensed between probe ends 124a, 124b. The output signal can be provided on one or more wires 134a, 134b. The output signal can be used to sound an alarm and/or to shut off power to the air cooling device to prevent further liquid from collecting in the drain pan, which ultimately would overflow, potentially causing damage to the building.

For example, the control circuit can be designed such that when liquid is present between the probe ends 124a and 124b, a circuit is completed, which energizes a coil, causing a relay to operate. Operation of the relay can cause contacts of the relay to separate and thereby open a circuit associated with the thermostat of the air cooling system so that the air cooling system shuts off. Additionally, operation of the relay can cause other contacts to close a circuit causing an audible and/or visible alarm to be activated. Of course, other arrangements are possible for converting the sensing of liquid between two probe ends into the shut-off of an air cooling system along with activation of an alarm.

Preferably, the control circuit 128 is provided on a printed circuit board (PCB), which is encapsulated by a resin layer 129 and mounted directly on drain tube body portion 112. The control circuit also can be an application specific integrated circuit (ASIC) or a programmed microprocessor. An additional casing 131 made from, for example, plastic, can be provided over the encapsulated control circuit 128 to act as a physical barrier protecting the encapsulated control circuit 128. Alternatively, the control circuit 128 could be mounted on the cross-shaped fitting 140 or at a position spaced away from the tubing, which would require wires to extend between the second ends of probe elements 122a, 122b and the control circuit 128.

The combination of the encapsulated PCB and the casing 131 can be made as a modular control unit 130, which is readily detachable from drain tube 110 to allow for easy replacement of the control unit 130 (and associated control circuit 128) when the control circuit 128 malfunctions, wears-out or requires upgrading. For example, the second ends of probe elements 122a and 122b can be made to protrude through the surface of drain tube 110 forming male portions of a plug-type connector. The encapsulated PCB would include sockets for removably receiving the second ends of the probe elements 122a and 122b so as to electrically couple the probe elements 122a and 122b to the control circuit 128 and so as to physically mount control unit 130 on drain tube 110.

FIG. 5 is a block diagram of the control electronics that can be used with the FIG. 3 embodiment of the present invention. As detailed above, the control circuit 128 can be coupled to an alarm 182, which can be, for example an audible alarm such as a buzzer and/or a visual alarm such as a light that becomes actuated on a control panel that can be provided at a convenient location in the building. The control circuit 128 preferably also is attached to a cut-off switch 184 (e.g., the previously described coil and relay), which cuts-off the supply of electricity to the air cooling device when a blockage is detected.

The control circuit can be designed so that it stops generating the output signal when liquid no longer is present at the probe end 124 of the probe 120. In this example, as soon as liquid in the drain pan drops below the level of the probe end 124, the cut-off switch 184 would be closed so that the air cooling device becomes operative and the alarm 182 is shut off. Some jurisdictions, however, require that a manual reset switch 192 be provided to ensure that operator intervention takes place prior to allowing the air cooling device to become operative. The manual reset switch 192 can be any well known type of mechanical switch, and would be placed into an open position by control circuit 128 when liquid is sensed, and would require a person to manually return the switch to the closed position. (This could be accomplished by using a relay in the previously described coil-relay combination, wherein the relay switches to the open condition upon sensing of liquid, and requires manual activation to be returned to the closed position.) Of course, the function performed by a mechanical switch also could be performed electronically, although some type of manually operable member would be provided for manual actuation.

There are occasions when a certain amount of liquid normally collects in the drain pan. This liquid can slosh about in the drain pan when air is flowing through the air handling system. When the liquid is sloshing about within the drain pan, the liquid could inadvertently periodically cover the probe end 124 causing the control circuit to switch the air cooling device on and off. Such periodic on and off switching could damage the compressor of the air cooling device. Accordingly, in order to prevent the above-described situation from occurring, a delay circuit 198 can be provided. The delay circuit would inhibit the generation of the output signal unless liquid in the drain pan remained in contact with the probe end 124 for a predetermined time period, for example, 30 seconds. The delay circuit could be made adjustable so that the time period could be adjusted. This would ensure that the air cooling device is shut off only when a blockage exists that causes the overall level of liquid in the drain pan to increase.

Additionally, further adjustments can be provided for the control circuit 128 so as to fine-tune the control circuit 128 to the particular environment in which it is used. Since the particles naturally present in the air also are present in the liquid collected in the drain pan, the electrical potential of the collected liquid can vary depending on the environment in which the air cooling system is used. An adjustment circuit 194 can be provided on the control circuit to compensate for the electrical potential of the collected liquid to ensure that the probe accurately detects when liquid is present at the probe end. Circuits for adjusting the sensitivity of liquid sensing probes based on the electrical potential of the sensed liquid are well known.

Returning to FIG. 3, the drain tube/liquid sensing unit 100 preferably is used in conjunction with a cleanable condensate trap. The cleanable condensate trap includes a U-shaped tube 160 having a first end 162 and a second end 164, and at least a cross-shaped fitting 140. The U-shaped tube preferably is transparent so that any blockages therein can be visually detected. The cross-shaped fitting 140 includes a first leg 142, a second leg 144 located opposite to the first leg 142, a third leg 148 located between the first and second legs 142, 144, and a fourth leg 146 located opposite from the third leg 148. The first leg 142 is attached to the outlet end 117 of the drain tube 110. The connection between first leg 142 and outlet end 117 can be permanent (for example glue) or temporary (by using, for example, a threaded connection or a sliding connection using a rubber gasket as illustrated, for example, in FIG. 3 of U.S. Pat. No. 5,069,042). The second leg 144 is provided with a removable cap 152. The cap 152 can be plastic and include a living hinge as illustrated in FIG. 3. Alternatively, a plug-type member can be inserted and/or screwed into second leg 144 to provide the removable cap. When a blockage occurs in the drain pan, in drain tube 110, or in first leg 142, a cleaning device such as, for example, flexible cleaning tool 28 (FIG. 4) having a brush on its distal end can be inserted in the direction of arrow Q (see FIG. 3) through the second leg 144, the first leg 142, and the drain tube 110. The cleaning tool 28 also can include a ring 30 to permit it to be stored, for example, by hanging on a hook, which may be provided on the cross-shaped fitting 140.

The fourth leg 146 of the cross-shaped fitting 140 includes a cap 154, which can be similar to cap 152. Any blockages existing in the U-shaped tube 160 can be removed easily by inserting the cleaning tool 28 in the direction of arrow P through fourth leg 146, third leg 148 and the U-shaped tube 160. Preferably, the second end 164 of the U-shaped tube 160 is attached to a T-shaped fitting 170. The cleaning device can have a length such that the brush on its distal end will extend through a first leg 174 and a second leg 172 of the T-shaped fitting 170 when the cleaning tool 28 is inserted through the U-shaped tube 160 via fourth leg 146 of the cross-shaped fitting 140. A third leg 176 of the T-shaped tube 170 would be attached to subsequent tubing that transports liquid to, for example, a drain. A removable cap also can be provided on the second leg 172 of T-shaped fitting 170.

Figure 1:
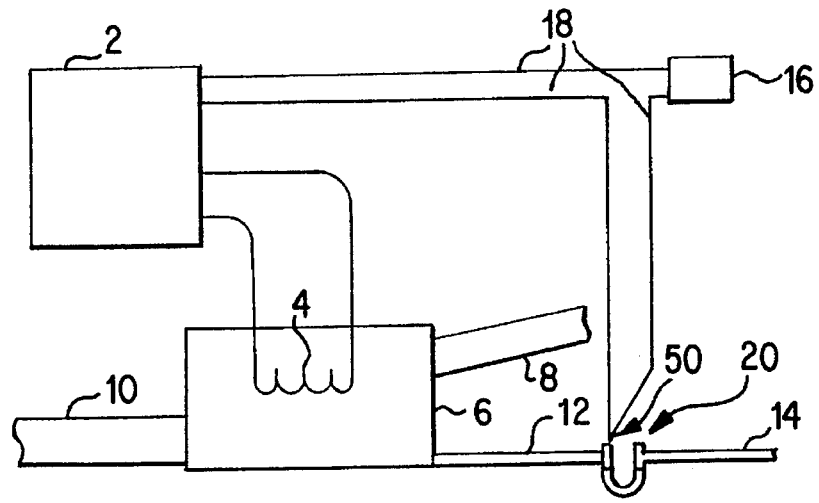
FIG. 1 is a diagrammatic view of an air cooling system incorporating a prior art cleanable condensate trap.
Figure 6:
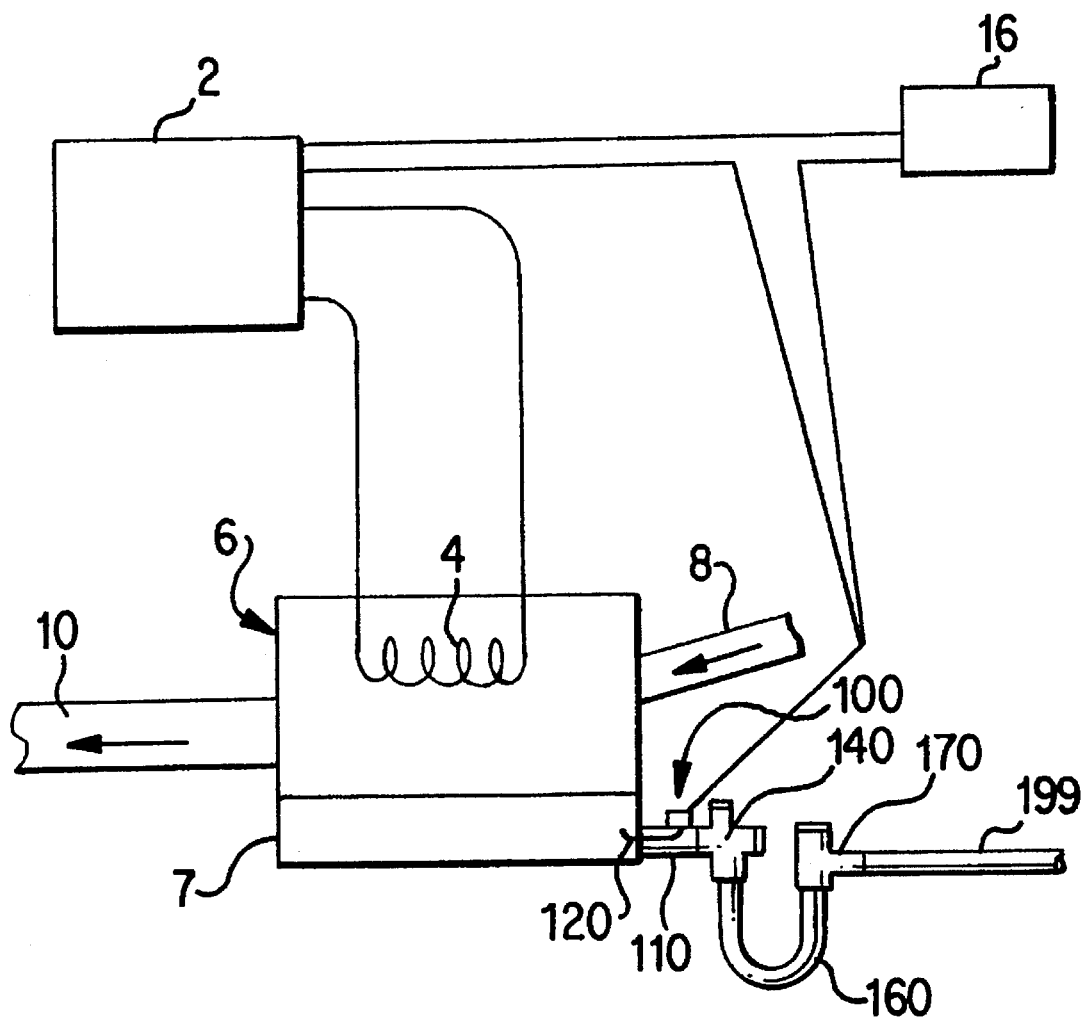
FIG. 6 is a diagrammatic view of an air cooling system incorporating the cleanable condensate trap and liquid sensor probe of the FIG. 3 embodiment of the present invention.

FIG. 6 is a diagrammatic view of an air cooling system incorporating the cleanable condensate trap and liquid sensor probe of FIG. 3. The system is similar to the FIG. 1 system, except that the blockage detector and trap of FIG. 3 is provided. The inlet end of the drain tube 110 is attached to the drain pan 7 of the air cooling system air handler 6 so that the probe end of the probe 120 extends into the drain pan 7. The third leg 176 of T-shaped tube 70 is attached to subsequent drainage tubing 199 that can lead, for example, to a drain. The system can operate to shut off the cooling device 2 in a manner similar to the FIG. 2 prior art system, except that the switching is initiated electronically (i.e., by the control circuit 128 on the PCB), rather than mechanically (i.e., by a float).

The disclosed embodiment of the present invention enables the entire unit to be fitted entirely from the outside of the air cooling system, as opposed to previous systems that included sensing units on the primary or secondary pan. Additionally, unlike float operated microswitches, the entirely electronic system of the present invention is not subject to switch failure or misalignment or loosening of the mounting screws, which can occur due to vibration that is always present when the air cooling system is operating. That is, the disclosed embodiment does not include moving parts or linkages that could loosen or fail due to vibrations.

Preferably, the electronic assembly of the disclosed embodiment is modular so that in the event of an electronic malfunction, the control unit 130 (i.e., encapsulated control circuit 128 and casing 131) can be quickly removed and replaced with a new control unit 130. The disclosed embodiment also provides for easy access of a cleaning device to the drain pan and drain tube without opening the cooling unit.

Another advantage of the disclosed electronic control circuit is that it can be adapted for use with additional sensors to monitor conditions other than blockage of the condensate drain system. FIG. 7 is a block diagram of an arrangement in which the control circuit 128 is provided with inputs from an air pressure sensor 210, a smoke detector 220 and a carbon monoxide detector 230 in addition to condensate probe 120. The air pressure sensor 210 can be provided in an air flow duct of the air cooling system so that a clogged condition of the flow duct (caused, for example, by a clogged air filter or other obstruction) can be detected. When the sensed air pressure rises above a predetermined value, control circuit 128 activates an alarm and/or shuts off the air handling system. The smoke detector 220 and the carbon monoxide sensor can be provided in the air flow duct or elsewhere in the building so that excessive smoke or carbon monoxide can be detected by control circuit 128, which would activate an appropriate alarm and/or shut off the air handling system.

The use of a single control circuit to monitor various conditions is convenient and can be used with a single alarm, such as alarm 282 in FIG. 8, to indicate the status of the various detectors, sensors, probes, etc. The FIG. 8 alarm 282 is designed for monitoring a plurality of units, for example, plural motel or hotel rooms or apartments. Separate lights 284 become lighted when an undesired condition is sensed.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. Apparatus comprising:

a drain tube for draining a drain pan, said drain tube having an inlet end and an outlet end;

a liquid sensor probe located at least partially in said drain tube, said liquid sensor probe having a probe end extending from said drain tube inlet end into the drain pan, said probe end including at least one electrode; and a control circuit attached to a second end of said liquid sensor probe, said control circuit generating an output signal when excess liquid is present at said probe end of said liquid sensor probe.

2. Apparatus as in claim 1, wherein said drain tube inlet end includes a connector.

3. Apparatus as in claim 2, wherein said connector is a threaded coupling.

4. Apparatus as in claim 1, further comprising an alarm coupled to said control circuit so that said output signal triggers said alarm.

5. Apparatus as in claim 1, further comprising a switch coupled to said control circuit so that said output signal opens said switch.

6. Apparatus as in claim 1, wherein said control circuit is mounted on said drain tube.

7. Apparatus as in claim 6, wherein said control circuit is included in a module that is detachably mounted on said drain tube.

8. Apparatus as in claim 6, wherein said control circuit includes a printed circuit board encapsulated by a resin.

9. Apparatus as in claim 1, further comprising a cross-shaped fitting, said drain tube outlet end being attached to a first leg of said cross-shaped fitting, said cross-shaped fitting having a second leg opposite to said first leg, said second leg including a removable cover so that a cleaning tool can be inserted into said drain tube through said second leg and said first leg.

10. Apparatus as in claim 9, wherein said cross-shaped fitting includes a third leg between said first leg and said second leg, and further comprising a U-shaped trap tube, said third leg being attached to a first leg of said U-shaped trap tube.

11. Apparatus as in claim 10, wherein said U-shaped trap tube is transparent.

12. Apparatus as in claim 10, further comprising a T-shaped tube having a first leg attached to a second leg of said U-shaped trap tube.

13. Apparatus as in claim 10, wherein said cross-shaped fitting includes a fourth leg opposite to said third leg, said fourth leg including a removable cover so that a cleaning tool can be inserted into said U-shaped trap tube through said fourth leg and said third leg.

14. Apparatus as in claim 1, further comprising a cleaning tool removably attached to said drain tube, said cleaning tool including a brush.

15. Apparatus as in claim 1, wherein said control circuit includes an adjustable sensitivity control circuit that controls the sensitivity with which said output signal is generated by said control circuit.

16. Apparatus as in claim 15, wherein said adjustable sensitivity control circuit compensates for an electrical potential of liquid located at said probe end of said liquid sensor probe.

17. Apparatus as in claim 1, wherein said control circuit includes an adjustable delay circuit that controls a delay period required between a time that liquid is initially sensed by said probe end of said liquid sensor probe and a time when said output signal is generated.

18. Apparatus as in claim 1, wherein said at least one electrode includes a pair of spaced apart stainless steel electrodes.

19. Apparatus as in claim 1, further comprising an additional sensor different from said liquid sensor probe, said additional sensor including at least one of an air pressure sensor, a smoke detector and a carbon monoxide detector, said control circuit attached to said additional sensor and generating an additional signal in response to an output of said additional sensor.

20. An air cooling system comprising:

an air cooling device that includes an air handling chamber that contains air contacted with said air cooling device, said air handling chamber including a drain pan that collects liquid removed from the cooled air as a result of condensation, said drain pan including a liquid outlet;

a drain tube having an inlet end and an outlet end, said inlet end coupled to said drain pan liquid outlet;

a liquid sensor probe extending at least partially through said drain tube, said liquid sensor probe having a probe end extending into said drain pan and positioned to sense an increase in liquid level in said drain pan due to a blockage, said probe end including at least one electrode; and a control circuit attached to said liquid sensor probe, said control circuit generating an output signal when said probe end senses an increase in liquid level in said drain pan due to a blockage.

21. An air cooling system as in claim 20, wherein said drain tube inlet is removably attached to said drain pan liquid outlet.

22. An air cooling system as in claim 20, further comprising an alarm coupled to said control circuit so that said output signal triggers said alarm.

23. An air cooling system as in claim 20, further comprising a switch coupled to said control circuit so that said output signal opens said switch.

24. An air cooling system as in claim 20, wherein said control circuit is mounted on said drain tube.

25. An air cooling system as in claim 20, further comprising a cross-shaped fitting, said drain tube outlet end being attached to a first leg of said cross-shaped fitting, said cross-shaped fitting having a second leg opposite to said first leg, said second leg including a removable cover so that a cleaning tool can be inserted into said drain tube through said second leg and said first leg.

26. An air cooling system as in claim 25, wherein said cross-shaped fitting includes a third leg between said first leg and said second leg, and further comprising a U-shaped trap tube, said third leg being attached to a first leg of said U-shaped trap tube.

27. An air cooling system as in claim 26, further comprising a T-shaped tube having a first leg attached to a second leg of said U-shaped trap tube.

28. An air cooling system as in claim 26, wherein said cross-shaped fitting includes a fourth leg opposite to said third leg, said fourth leg including a removable cover so that a cleaning tool can be inserted into said U-shaped trap tube through said fourth leg and said third leg.

29. An air cooling system as in claim 20, wherein said control circuit includes an adjustable sensitivity control circuit that controls the sensitivity with which said output signal is generated by said control circuit.

30. An air cooling system as in claim 29, wherein said adjustable sensitivity control circuit compensates for an electrical potential of the liquid located at said probe end of said liquid sensor probe.

31. An air cooling system as in claim 20, wherein said control circuit includes an adjustable delay circuit that controls a delay period required between a time that liquid is initially sensed by said probe end of said liquid sensor probe and a time when said output signal is generated.

32. An air cooling system as in claim 20, wherein said probe end includes a pair of spaced apart stainless steel electrodes.

33. An air cooling system as in claim 20, further comprising an additional sensor different from said liquid sensor probe, said additional sensor including at least one of an air pressure sensor, a smoke detector and a carbon monoxide detector, said control circuit attached to said additional sensor and generating an additional signal in response to an output of said additional sensor.

34. A cleanable condensate trap comprising:

a drain tube for draining a drain pan, said drain tube having an inlet end and an outlet end;

a liquid sensor probe located at least partially in said drain tube, said liquid sensor probe having a probe end extending from said drain tube inlet end into the drain pan, said probe end including at least one electrode;

a control circuit attached to said liquid sensor probe, said control circuit generating an output signal when excess liquid is present at said probe end of said liquid sensor probe;

a cross-shaped fitting having a first leg attached to said drain tube outlet end, said cross-shaped fitting having a second leg opposite to said first leg, said second leg including a removable cover; and a cleaning tool for cleaning upon insertion into said drain tube through said second leg and said first leg, said cleaning tool being stored externally of said cleanable trap when not being used to clean.

35. A cleanable condensate trap as in claim 34, wherein said drain tube inlet end includes a threaded connector.

36. A cleanable condensate trap as in claim 34, wherein said control circuit is mounted on said drain tube.

37. A cleanable condensate trap as in claim 36, wherein said control circuit includes a printed circuit board encapsulated by a resin.

38. A cleanable condensate trap as in claim 34, wherein said cross-shaped fitting includes a third leg between said first leg and said second leg, and further comprising a U-shaped trap tube, said third leg being attached to a first leg of said U-shaped trap tube.

39. A cleanable condensate trap as in claim 38, further comprising a T-shaped tube having a first leg attached to a second leg of said U-shaped trap tube.

40. A cleanable condensate trap as in claim 38, wherein said cross-shaped fitting includes a fourth leg opposite to said third leg, said fourth leg including a removable cover so that the cleaning tool can be inserted into said U-shaped trap tube through said fourth leg and said third leg.

41. A cleanable condensate trap as in claim 34, wherein said cleaning tool includes a brush.

* * * * *